(12) United States Patent
Dunahoo et al.

(10) Patent No.: US 12,337,424 B2
(45) Date of Patent: Jun. 24, 2025

(54) SYSTEMS AND METHODS FOR AUTOMATIC CONTROL OF WELDING PARAMETER OUTPUT RANGES

(71) Applicant: Illinois Tool Works Inc., Glenview, IL (US)

(72) Inventors: Jason Dunahoo, De Pere, WI (US); Caleb Rosera, Glenview, IL (US); Nathan Johnson, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 577 days.

(21) Appl. No.: 17/015,303

(22) Filed: Sep. 9, 2020

(65) Prior Publication Data

US 2021/0101220 A1     Apr. 8, 2021

Related U.S. Application Data

(60) Provisional application No. 62/909,516, filed on Oct. 2, 2019.

(51) Int. Cl.
    *B23K 9/095*     (2006.01)
    *B23K 9/09*     (2006.01)
    (Continued)

(52) U.S. Cl.
    CPC .......... *B23K 9/0953* (2013.01); *B23K 9/091* (2013.01); *B23K 9/1062* (2013.01); *B23K 9/125* (2013.01); *B23K 9/32* (2013.01)

(58) Field of Classification Search
    CPC ..... B23K 9/0953; B23K 9/1062; B23K 9/125
    (Continued)

(56) References Cited

U.S. PATENT DOCUMENTS

| | | | | |
|---|---|---|---|---|
| 6,087,613 A | * | 7/2000 | Buda | B23K 11/257 |
| | | | | 219/110 |
| 6,236,017 B1 | * | 5/2001 | Smartt | B23K 31/125 |
| | | | | 219/130.01 |

(Continued)

FOREIGN PATENT DOCUMENTS

| | | | | |
|---|---|---|---|---|
| CN | 101323046 | * | 6/2008 | ............. B23K 11/11 |
| DE | 2813339 | | 10/1979 | |

(Continued)

OTHER PUBLICATIONS

CN101323046 Takahashi (Year: 2008).*

(Continued)

*Primary Examiner* — Jimmy Chou
(74) *Attorney, Agent, or Firm* — McAndrews, Held & Malloy, Ltd.

(57) ABSTRACT

Disclosed example power supplies, user interfaces, and methods are provided for intuitive or automatic control of welding parameter output ranges. The disclosed systems and methods provide tools for setup of configurable and/or default settings for a welding power source and/or wire feeder. Weld settings include upper and lower limits for an operating range corresponding to one or more welding parameters, such that a welding parameter value is bound by the upper and lower limits during a welding operation. In some examples, the operating range, and the corresponding upper and lower limits, are calculated or determined based on a selected range tolerance.

20 Claims, 6 Drawing Sheets

(51) Int. Cl.
  *B23K 9/10* (2006.01)
  *B23K 9/12* (2006.01)
  *B23K 9/32* (2006.01)
(58) Field of Classification Search
  USPC .................................................. 219/130.01
  See application file for complete search history.

(56) References Cited

U.S. PATENT DOCUMENTS

| | | | | |
|---|---|---|---|---|
| 8,546,726 | B2* | 10/2013 | Vogel | B23K 9/0956 |
| | | | | 219/130.21 |
| 2009/0173726 | A1* | 7/2009 | Davidson | B23K 9/0953 |
| | | | | 219/130.01 |
| 2009/0314412 | A1 | 12/2009 | Joerg | |
| 2010/0133250 | A1* | 6/2010 | Sardy | B23K 9/125 |
| | | | | 219/130.31 |
| 2010/0200553 | A1* | 8/2010 | Yamazaki | B23K 9/0956 |
| | | | | 219/136 |
| 2010/0308026 | A1* | 12/2010 | Vogel | B23K 9/1006 |
| | | | | 219/130.21 |
| 2012/0111842 | A1* | 5/2012 | Fujiwara | B23K 9/09 |
| | | | | 219/130.33 |
| 2012/0234813 | A1* | 9/2012 | Ryan | B23K 9/095 |
| | | | | 219/137 R |
| 2013/0001209 | A1* | 1/2013 | Hirota | B23K 9/124 |
| | | | | 219/130.01 |
| 2016/0288236 | A1* | 10/2016 | Becker | B23K 9/0953 |
| 2017/0113292 | A1* | 4/2017 | Nishimura | B23K 9/124 |

FOREIGN PATENT DOCUMENTS

| | | | | |
|---|---|---|---|---|
| DE | 2813339 | A * | 10/1979 | ........... B23K 9/0953 |
| DE | 102014210699 | | 12/2015 | |
| EP | 0644012 | | 3/1995 | |

OTHER PUBLICATIONS

European Office Communication Appln No. 20197557.0 dated Mar. 22, 2021.
Canadian Office Communication Appln. No. 3,092,852 dated Dec. 6, 2021.
European Examination Report Appln No. 20197557 dated Aug. 21, 2023.

* cited by examiner

SYSTEMS AND METHODS FOR AUTOMATIC CONTROL OF WELDING PARAMETER OUTPUT RANGES

CROSS REFERENCE TO RELATED APPLICATIONS

This application is a Non-Provisional Patent Application which claims priority to U.S. Provisional Patent Application No. 62/909,516, entitled "Systems And Methods For Automatic Control Of Welding Parameter Output Ranges", filed Oct. 2, 2019, the contents of which are herein incorporated by reference in their entirety.

BACKGROUND

A common metal welding technique employs the heat generated by electrical arcing to transition a work piece to a molten state, to facilitate a welding process. One technique that employs this arcing principle is wire feed welding. If the welding device is properly adjusted, the wire feed advancement and arcing cycle progresses smoothly, providing a good weld.

Traditionally, during a welding operation, an operator selects the level and types of resources provided to the weld location, depending on the particulars of the weld and the materials being welded. Different kinds of wire electrode, however, perform well at different operational settings of the welding device.

Conventionally, welding devices rely on the knowledge and acumen of the operator to select the most appropriate voltage level, wire feed settings, etc., for the wire electrode being used under the particular weld conditions. In many cases, however, the weld operator is a novice to the field. If the operator does not properly adjust the voltage and wire feed speed settings for each attempted welding operation, the arcing may not be sufficient to produce a good weld, or any weld at all. Furthermore, in traditional devices, the wire feed speed control and the voltage control are either independent of one another or directly linked, making it difficult for the operator to adjust the welding parameters to achieve a desired set of parameters.

SUMMARY

Disclosed example power supplies, user interfaces, and methods are provided for intuitive or automatic control of welding parameter output ranges. The disclosed systems and methods provide tools for setup of configurable and/or default settings for a welding power source and/or wire feeder. Weld settings include upper and lower limits for an operating range corresponding to one or more welding parameters, such that a welding parameter value is bound by the upper and lower limits during a welding operation. In some examples, the operating range, and the corresponding upper and lower limits, are calculated or determined based on a selected range tolerance.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

The figures are not necessarily to scale. Where appropriate, similar or identical reference numbers are used to refer to similar or identical components.

DETAILED DESCRIPTION

Figure 1A:
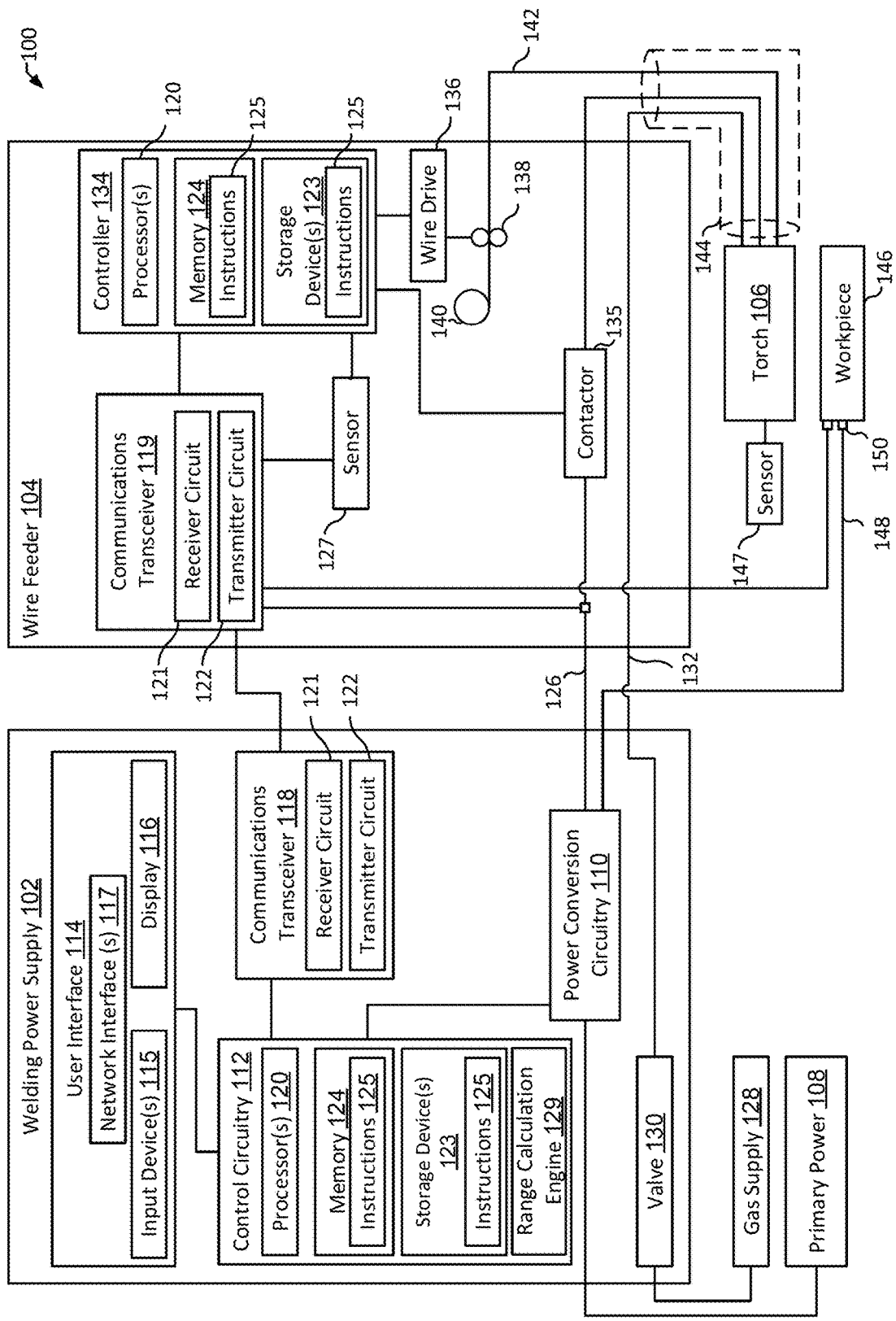
FIG. 1A is a schematic diagram of an example welding system including a power supply having a user interface to implement automatic control of welding parameter output ranges, in accordance with aspects of this disclosure.

Disclosed example power supplies, user interfaces, and methods provide intuitive tools for setup of configurable and/or default settings for a welding power source and/or wire feeder. In some examples, the settings include upper and lower limits for an operating range corresponding to one or more welding parameters. The limits are set such that any change in a welding parameter value (e.g., an output value) during a welding operation is bound by the upper and lower limits.

In some examples, the operating range, and the corresponding upper and lower limits, are calculated or determined based on a selected range tolerance. In other words, an input can indicate the tolerance associated with a particular range. The input can correspond to an operator input and/or data associated with a particular weld program, weld tool or weld process type. In some examples, one or more range tolerances are available for selection, such that a strict range tolerance can be employed having upper and lower limits calculated or determined to provide relatively little variation from a selected welding parameter value. A broad range tolerance can be employed, which calculates or determines upper and lower limits to allow for greater relative variation from the selected welding parameter value. Additionally or alternatively, a standard (e.g., default) setting can be employed, such that variation between the upper and lower limits lies between the strict tolerance limits and the broad tolerance limits (e.g., +/−7% for voltage; +/−10% for current).

Adjusting the ranges, and in particular the range tolerances, for welding parameters in conventional systems is cumbersome, requiring each boundary value to be individually selected manually, for example. In some instances, boundaries are automatically set for all applicable welding parameter ranges without any opportunity to customize the boundaries or ranges. Advantageously, the presently disclosed systems and methods provide for an intuitive solution, such that operating limits and boundaries can be easily calculated or determined based on one or more factors (e.g., one or more range tolerance selections), for each welding parameter or for two or more related welding parameters.

In some examples, a welding system includes a power source to deliver power to a welding tool based on one or more welding parameters (e.g., voltage, current, power, wire feed speed, gas flow rate, pulse rate, workpiece thickness, workpiece material type, electrode type, welding process, travel speed, arc length, or joint type, etc.). As disclosed herein, the welding parameters may have values, including a range with upper and lower operating limits, which correspond to a default and/or factory setting. The welding parameter values and range of operating limits may represent empirically observed and/or determined values for a particular welding parameter and/or welding procedure (e.g., based on material type, electrode diameter, welding process and/or tool, etc.).

The welding parameters may be configured for a particular purpose. In other words, a welding program or sequence can provide configured values for one or more welding parameters to control circuitry. In some examples, a range tolerance setting can be selected for each welding parameter, such that the control circuit controls the system output based on the selected welding parameter values and/or the associated range tolerance. Having established a controlling range tolerance for one or more of the applicable welding parameters, the control circuitry calculates or determines an upper and a lower limit for each welding parameter, a control circuitry controls the power source to deliver power (or, in some welding operations, for the welding wire feeder to advance the electrode wire) based on the controlling range for the applicable welding parameters.

Furthermore, once a range tolerance has been set for one or more welding parameters, the settings may return to the default (e.g., standard, factory, etc.) settings by resetting the range tolerance for the one or more welding parameters. For instance, an operator (e.g., a welding supervisor, administrator, and/or the welder) can provide an input corresponding to a selection for a return to the default range tolerance for the welding parameters. For example, the controller can access the default welding parameter range tolerance settings from a list of values associated with one or more default welding parameters range tolerances (e.g., corresponding to best practices, empirically obtained values, etc.). Having been successfully reset, the power source delivers power (and/or the welding wire feeder advances the electrode wire) based on the default welding parameter range tolerances.

The selection of a specific range tolerance (e.g., whether the range tolerance corresponds to a strict, standard, or broad tolerance) and the value of the welding parameter can be displayed on a display device presented to the operator. For example, the display can include a color scheme indicating a particular range tolerance and/or an information bar to display graphics or text to the operator corresponding to the present output values, selected range tolerance, and/or instructions or responses to aid in adjusting the welding parameter values and/or the range tolerances.

In some examples, each applicable welding parameter can be assigned a unique range tolerance, such that, even as one or more output values are adjusted during the welding operation, any calculated or determined range limits are consistent with an assigned range tolerance.

In disclosed examples, a welding system includes control circuitry to control a power source based on a range of values associated with one or more welding parameters. The control circuitry receives a selected range tolerance from one or more range tolerances associated with the one or more welding parameter, calculates or determines an upper limit value and a lower limit value based on the selected range tolerance and a welding parameter of the one or more welding parameters, and controls the power source to deliver power based on the selected welding parameter.

In some examples, the one or more range tolerance selections comprises a strict range tolerance, a standard range tolerance, or a broad range tolerance. In examples, the controller is further configured to adjust the range tolerance between a low limit of the strict range tolerance and a high limit of the broad range tolerance in response to an input.

In some examples, the input is a change in a welding parameter of the one or more welding parameters. In examples, the input is an operator input from a user interface, the user interface comprising one or more of a knob, a touchscreen panel, or a dial.

In some examples, the strict range tolerance is more narrow than the standard range tolerance, and the standard range tolerance is more narrow than the broad range tolerance. In examples, the control circuitry is further configured to calculate or determine the upper limit value and the lower limit value such that a predetermined value is added to or subtracted from the selected welding parameter value, respectively. In some examples, the predetermined value comprises a first predetermined value and a second predetermined value, the first predetermined value is added to the selected value and the second predetermined value is subtracted from the selected value, wherein the first predetermined value and the second predetermined value are different.

In examples, the control circuitry is further configured to calculate or determine the upper limit value and the lower limit value by adding a first percentage of an absolute value of the selected welding parameter value to the selected welding parameter value, or subtracting a second percentage of the absolute value of the selected welding parameter value from the selected welding parameter value.

In some examples, the one or more welding parameters further comprises a second welding parameter, the welding parameter selects the range tolerance from a first plurality of range tolerances of the one or more range tolerances and the second welding parameter selects a second range tolerance from a second plurality of range tolerances of the one or more range tolerances, the second plurality of range tolerances being different from the first plurality of range tolerances.

In examples, the one or more welding parameters includes one or more of voltage, current, power, wire feed speed, gas flow rate, pulse rate, workpiece thickness, workpiece material type, electrode type, welding process, travel speed, arc length, or joint type.

In disclosed examples, a welding system includes a power source configured to deliver power to a welding tool based on one or more welding parameters. A welding wire feeder configured to advance a wire electrode to the welding torch based on the one or more welding parameters. And control circuitry controls the power source or the wire feeder based on a range of values associated with the one or more welding parameters. The control circuitry receives a selection for a welding parameter value associated with a first welding parameter of the one or more welding parameters, receives a selected range tolerance from one or more range tolerances associated with the first welding parameter, calculates or determines an upper limit value and a lower limit value for the range of values based on the selected range tolerance and the selected welding parameter value, and controls the power source to deliver power or the welding wire feeder to advance the electrode wire based on the range of values and the selected welding parameter value.

In some examples, the control circuitry is further configured to designate the selected welding parameter value and the corresponding range of values as a customized welding parameter setting, and to store the selected welding parameter value and the corresponding range of values in a list of values associated with one or more customized welding parameters.

In examples, the control circuitry is further configured to receive an input corresponding to a customized welding parameter setting; and control the power source to deliver power or the welding wire feeder to advance the electrode wire based on the customized welding parameter setting.

In some examples, the control circuitry is further configured to receive an input relating to a welding process type, and calculate or determine the range of values for one or more of the welding parameters based at least in part on a range tolerance associated with one or more welding parameters of the welding process type.

In examples, the welding process type input device comprises a selectable option of one or more of a gas metal gas arc welding (GMAW), a gas tungsten arc welding (GTAW), plasma cutting, Carbon Arc Cutting-Air (CAC-A), or a stick welding process as the welding process type.

In some examples, the control circuitry is further configured to receive an input corresponding to one or more default settings for the one or more welding parameters, access the default settings from a list of values associated with the one or more welding parameters, and control the power source to deliver power or the welding wire feeder to advance the electrode wire based on the one or more default settings.

In examples, the control circuitry is further configured to receive a selection for a second welding parameter value associated with a second welding parameter of the one or more welding parameters, receive a second selected range tolerance from one or more range tolerances associated with the second welding parameter, calculate or determine an upper limit value and a lower limit value for a second range of values based on the selected range tolerance and the selected second welding parameter value, and control the power source to deliver power or the welding wire feeder to advance the electrode wire based on the second range of values and the selected second welding parameter value.

In disclosed examples, a welding system includes a welding wire feeder configured to advance a wire electrode to a welding torch based on one or more welding parameters; and a control circuitry to control the wire feeder based on a range of values associated with the one or more welding parameters, the control circuitry configured to receive a selection for a welding parameter value associated with a first welding parameter of the one or more welding parameters; receive a selected range tolerance from one or more range tolerances associated with the first welding parameter; calculate or determine an upper limit value and a lower limit value for the range of values based on the selected range tolerance and the selected welding parameter value; and control the welding wire feeder to advance the electrode wire based on the range of values and the selected welding parameter value.

In some examples, the control circuitry determines the upper limit value and the lower limit value by accessing a list of of welding parameter values corresponding to upper limit values or lower limit values; comparing the selected welding parameter value to the listing of welding parameter values; and determining one or more of the upper limit value or the lower limit value based on the listed values and the welding parameter values.

As used herein, "power conversion circuitry" and/or "power conversion circuits" refer to circuitry and/or electrical components that convert electrical power from one or more first forms (e.g., power output by a generator) to one or more second forms having any combination of voltage, current, frequency, and/or response characteristics. The power conversion circuitry may include safety circuitry, output selection circuitry, measurement and/or control circuitry, and/or any other circuits to provide appropriate features.

As used herein, the terms "first" and "second" may be used to enumerate different components or elements of the same type, and do not necessarily imply any particular order.

The term "welding-type system," as used herein, includes any device capable of supplying power suitable for welding, plasma cutting, induction heating, Carbon Arc Cutting-Air (e.g., CAC-A), and/or hot wire welding/preheating (including laser welding and laser cladding), including inverters, converters, choppers, resonant power supplies, quasi-resonant power supplies, etc., as well as control circuitry and other ancillary circuitry associated therewith.

As used herein, the term "welding-type power" refers to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "circuit," or "circuitry," includes any analog and/or digital components, power and/or control elements, such as a microprocessor, digital signal processor (DSP), software, and the like, discrete and/or integrated components, or portions and/or combinations thereof.

The terms "control circuit," "control circuitry," and/or "controller," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards that form part or all of a controller, and are used to control a welding process, a device such as a power source or wire feeder, and/or any other type of welding-related system.

As used herein, the term "memory" includes volatile and non-volatile memory devices and/or other storage device.

As used herein, the term "torch," "welding torch," "welding tool" or "welding-type tool" refers to a device configured to be manipulated to perform a welding-related task, and can include a hand-held welding torch, robotic welding torch, gun, gouging tool, cutting tool, or other device used to create the welding arc.

As used herein, the term "welding mode," "welding process," "welding-type process" or "welding operation" refers to the type of process or output used, such as current-controlled (CC), voltage-controlled (CV), pulsed, gas metal arc welding (GMAW), flux-cored arc welding (FCAW), gas tungsten arc welding (GTAW, e.g., TIG), shielded metal arc welding (SMAW), spray, short circuit, CAC-A, gouging process, cutting process, and/or any other type of welding process.

As used herein, the term "welding program" or "weld program" includes at least a set of welding parameters for controlling a weld. A welding program may further include other software, algorithms, processes, or other logic to control one or more welding-type devices to perform a weld.

Turning now to the drawings, FIG. 1A is a block diagram of an example welding system 100 having a welding-type power supply 102, a wire feeder 104, and a welding torch 106. The welding system 100 powers, controls, and supplies consumables to a welding application for intuitive setup for configurable and/or default settings for the power supply 102 and/or wire feeder 104. In other words, an interface (such as an Auto-Set button) can be provided to allow an operator to adjust one or more welding parameters. A second input device (such as a selector switch, knob, touchscreen input) receives an input from the operator relating to a desired change in a value of the one or more welding parameters, to establish a configurable setting to control the system output in the absence of additional inputs. Furthermore, once a configurable set of welding parameters has been established, the operator may return to the default settings by resetting the welding parameters.

In some examples, the power supply 102 directly supplies input power to the welding torch 106. The welding torch 106 may be a torch configured for shielded metal arc welding (SMAW, or stick welding), gas tungsten arc welding (GTAW, or tungsten inert gas (TIG)) welding, gas metal arc welding (GMAW), flux cored arc welding (FCAW), based on the desired welding application. In the illustrated example, the power supply 102 is configured to supply power to the wire feeder 104, and the wire feeder 104 may be configured to route the input power to the welding torch 106. In addition to supplying an input power, the wire feeder 104 may supply a filler metal to a welding torch 106 for various welding applications (e.g., GMAW welding, flux core arc welding (FCAW)). While the example system 100 of FIG. 1A includes a wire feeder 104 (e.g., for GMAW or FCAW welding), the wire feeder 104 may be replaced by any other type of remote accessory device, such as a stick welding and/or GTAW welding remote control interface that provides stick and/or GTAW welding The power supply 102 receives primary power 108 (e.g., from the AC power grid, an engine/generator set, a battery, or other energy generating or storage devices, or a combination thereof), conditions the primary power, and provides an output power to one or more welding devices in accordance with demands of the system 100. The primary power 108 may be supplied from an offsite location (e.g., the primary power may originate from the power grid). The power supply 102 includes power conversion circuitry 110, which may include transformers, rectifiers, switches, and so forth, capable of converting the AC input power to AC and/or DC output power as dictated by the demands of the system 100 (e.g., particular welding processes and regimes). The power conversion circuitry 110 converts input power (e.g., the primary power 108) to welding-type power based on a weld voltage setpoint and outputs the welding-type power via a weld circuit.

In some examples, the power conversion circuitry 110 is configured to convert the primary power 108 to both welding-type power and auxiliary power outputs. However, in other examples, the power conversion circuitry 110 is adapted to convert primary power only to a weld power output, and a separate auxiliary converter 111 is provided to convert primary power to auxiliary power. In some other examples, the power supply 102 receives a converted auxiliary power output directly from a wall outlet. Any suitable power conversion system or mechanism may be employed by the power supply 102 to generate and supply both weld and auxiliary power.

The power supply 102 includes a control circuitry 112 to control the operation of the power supply 102. The power supply 102 also includes a user interface 114. The control circuitry 112 receives input from the user interface 114, through which a user may choose a process and/or input desired parameters (e.g., voltages, currents, particular pulsed or non-pulsed welding regimes, and so forth). The user interface 114 may receive inputs using one or more input devices 115, such as via a keypad, keyboard, physical buttons, a touch screen (e.g., software buttons), a voice activation system, a wireless device, etc. Furthermore, the control circuitry 112 controls operating parameters based on input by the user as well as based on other current operating parameters. Specifically, the user interface 114 may include a display 116 for presenting, showing, or indicating, information to an operator. The control circuitry 112 may also include interface circuitry for communicating data to other devices in the system 100, such as the wire feeder 104. For example, in some situations, the power supply 102 wirelessly communicates with other welding devices within the welding system 100. Further, in some situations, the power supply 102 communicates with other welding devices using a wired connection, such as by using a network interface controller (NIC) to communicate data via a network (e.g., ETHERNET, 10baseT, 10base100, etc.). In the example of FIG. 1A, the control circuitry 112 communicates with the wire feeder 104 via the weld circuit via a communications transceiver 118, as described below.

The control circuitry 112 includes at least one controller or processor 120 that controls the operations of the power supply 102. The control circuitry 112 receives and processes multiple inputs associated with the performance and demands of the system 100. The processor 120 may include one or more microprocessors, such as one or more "general-purpose" microprocessors, one or more special-purpose microprocessors and/or ASICS, and/or any other type of processing device. For example, the processor 120 may include one or more digital signal processors (DSPs).

In some examples, the control circuitry 112 is configured to implement the limit setting features disclosed herein. For instance, the control circuitry 112 receives an input (e.g., from an operator input and/or data associated with a particular weld program, tool or type) associated with a range tolerance from one or more range tolerance options. Based on the input, a range calculation engine 129 of the control circuitry 112 calculates or determines the upper limit value and the lower limit value. In examples, a welding parameter value is selected (e.g., from an operator input and/or data associated with a particular weld program, tool or type) and the range calculation engine 129 employs the selected range tolerance to calculate the upper limit value and the lower limit value. In some examples, a predetermined value (e.g., an integer) is calculated (e.g., based on the selected welding parameter type, welding parameter value, a welding program, or a combination of factors), and the predetermined value is then added to or subtracted from the selected welding parameter value, respectively, to generate the upper and lower limits. The limits are then employed by the control circuitry 112 to control the power source to deliver power and/or the wire feeder to advance the electrode wire based on the calculated limits and the selected welding parameter value.

In some examples, the same predetermined value (e.g., the same number) is used to calculate the upper and lower limits. In some examples, a first predetermined value is added to the selected welding parameter value, and a second, different predetermined value is subtracted from the selected welding parameter value. The difference can be determined empirically, calculated by the control circuitry 112, commanded by a user input or a welding program, for example.

In some examples, the range calculation engine 129 calculates the upper limit value and the lower limit value by adding a percentage of an absolute value of the selected welding parameter value to the selected welding parameter value, and/or by subtracting the same percentage (or a different percentage) of the absolute value of the selected welding parameter value to the selected welding parameter value.

A single selected range tolerance can be applied to each welding parameter of the one or more welding parameters (e.g., strict, standard, broad). In some examples, different range tolerances can be assigned to different welding parameters. For instance, a first welding parameter (e.g., voltage) can be assigned to a first range tolerance (e.g., a standard range tolerance). A second welding parameter (e.g., wire feed speed) can be assigned a second range tolerance (e.g., a strict range tolerance). Thus, the calculated ranges for the respective welding parameters will vary by different amounts, and the control circuitry 112 will command the power source to output the power in accordance with the respective range tolerances. In some examples, the first welding parameter selects a range tolerance from a first plurality of range tolerances (e.g., −/+5%, −/+10%, −/+15%) that is different from a second plurality of range tolerances (e.g., −/+10%, −/+20%, −/+30%) available to the second welding parameter. The specific values/percentages/tolerances for each range tolerance and/or plurality of range tolerances can be provided by an input, as disclosed herein.

In some examples, once a range or ranges have been calculated for a particular welding parameter(s), the range(s) can be designated as a customized setting. The customized setting can be associated with a particular welding operation, tool, welder, etc., and can be designated with an identifier for easy look up. The customized setting can then be stored in memory (e.g., in storage device(s) 123 and/or the memory 124), which can be recalled via the interface 114 and/or displayed on display 116 for review and selection.

In some examples, the control circuitry 112 accesses one or more lists or look up tables that include a listing of welding parameter values corresponding to upper limit values or lower limit values. For instance, the control circuitry 112 (e.g., via range calculation engine 112) compares an absolute value of the selected welding parameter value to the listing of welding parameter values and determines one or more of the upper limit value or the lower limit value based on listed values and a selected range tolerance from one or more range tolerances. The listed values (e.g., welding parameter values, upper limit values, lower limit values, etc.) may be customized (e.g., via user interfaces 114, 156) and can then be stored in memory (e.g., in storage device(s) 123 and/or the memory 124) for later access.

In some examples, the control circuitry 112 stores one or more welding program sequences, such as associated with a welding process type (e.g., metal inert gas (MIG) or a gas tungsten arc welding (GTAW) welding process, plasma cutting, etc.) in memory 124. As disclosed herein, each welding program sequence may contain one or more welding parameter values and associated ranges. In some examples, a input, such as from a user, can indicate the desired range tolerance, and the range calculation engine 129 calculates upper and lower limits for each welding parameter value of the selected welding program sequence, as disclosed herein. The control circuitry 112 can access the one or more welding program sequences in response to an input (e.g., from a weld operation sequence and/or an operator input). An input can be provided via user interface 114 and/or from a remote controller via network interface 117.

In some examples, the control circuitry 112 stores range tolerance settings for one or more welding parameters, such as in memory 124. In response to an input selecting the default settings, the ranges of the one or more welding parameters will return to the default setting. In examples, the customized settings can be adjusted using the processes disclosed herein, and/or deleted and removed from memory 124 in response to an input.

The example control circuitry 112 includes one or more storage device(s) 123 and one or more memory device(s) 124. The storage device(s) 123 (e.g., nonvolatile storage) may include ROM, flash memory, a hard drive, and/or any other suitable optical, magnetic, and/or solid-state storage medium, and/or a combination thereof. The storage device 123 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, deposition rate, wire feed speed, puddle fluidity, and so forth.

The memory device 124 may include a volatile memory, such as random access memory (RAM), and/or a nonvolatile memory, such as read-only memory (ROM). The memory device 124 and/or the storage device(s) 123 may store a variety of information and may be used for various purposes. For example, the memory device 124 and/or the storage device(s) 123 may store processor executable instructions 125 (e.g., firmware or software) for the processor 120 to execute. In addition, one or more control regimes for various welding processes, along with associated settings and parameters, may be stored in the storage device 123 and/or memory device 124, along with code configured to provide a specific output (e.g., initiate wire feed, enable gas flow, capture welding related data, detect short circuit parameters, determine amount of spatter) during operation. One or more lists or look up tables may be provided, and/or network connections to various databases available to inform decision-making, such as to access preferred welding parameters, to store updated welding parameter settings, etc.

In some examples, the welding power flows from the power conversion circuitry 110 through a weld cable 126 to the wire feeder 104 and the welding torch 106. The example weld cable 126 is attachable and detachable from weld studs at each of the power supply 102 and the wire feeder 104 (e.g., to enable ease of replacement of the weld cable 126 in case of wear or damage). Furthermore, in some examples, welding data is provided with the weld cable 126 such that welding power and weld data are provided and transmitted together over the weld cable 126. The communications transceiver 118 is communicatively coupled to the weld cable 126 to communicate (e.g., send/receive) data over the weld cable 126. The communications transceiver 118 may be implemented using serial communications (e.g., fullduplex RS-232 or RS-422, or half-duplex RS-485), network communications (e.g., Ethernet, PROFIBUS, IEEE 802.1X wireless communications, etc.), parallel communications, and/or any other type of communications techniques. In some examples, the communications transceiver 118 may implement communications over the weld cable 126.

The example communications transceiver 118 includes a receiver circuit 121 and a transmitter circuit 122. Generally, the receiver circuit 121 receives data transmitted by the wire feeder 104 via the weld cable 126 and the transmitter circuit 122 transmits data to the wire feeder 104 via the weld cable 126. The communications transceiver 118 enables remote configuration of the power supply 102 from the location of the wire feeder 104, and/or command and/or control of the wire feed speed output by the wire feeder 104 and/or the weld power (e.g., voltage, current) output by the power supply 102. In some examples, the communications are transmitted via a dedicated cable between components and/or wireless communications channels, as well as other suitable communications devices and/or techniques.

The example wire feeder 104 also includes a communications transceiver 119, which may be similar or identical in construction and/or function as the communications transceiver 118. While communication over a separate communications cable is illustrated in FIG. 1A, other communication media, such as wireless media, power line communications, and/or any other communications media, may be used.

In some examples, a gas supply 128 provides shielding gases, such as argon, helium, carbon dioxide, and so forth, depending upon the welding application. The shielding gas flows to a valve 130, which controls the flow of gas, and if desired, may be selected to allow for modulating or regulating the amount of gas supplied to a welding application. The valve 130 may be opened, closed, or otherwise operated by the control circuitry 112 to enable, inhibit, or control gas flow (e.g., shielding gas) through the valve 130. Shielding gas exits the valve 130 and flows through a cable 132 (which in some implementations may be packaged with the welding power output) to the wire feeder 104, which provides the shielding gas to the welding application. In some examples, the welding system 100 does not include the gas supply 128, the valve 130, and/or the cable 132.

In some examples, the wire feeder 104 uses the welding power to power the various components in the wire feeder 104, such as to power a wire feeder controller 134. As noted above, the weld cable 126 may be configured to provide or supply the welding power. The power supply 102 may also communicate with a communications transceiver 119 of the wire feeder 104 using the weld cable 126 and the communications transceiver 118 disposed within the power supply 102. In some examples, the communications transceiver 119 is substantially similar to the communications transceiver 118 of the power supply 102. The wire feeder controller 134 controls the operations of the wire feeder 104. In some examples, the wire feeder 104 uses the wire feeder controller 134 to detect whether the wire feeder 104 is in communication with the power supply 102 and to detect a current welding process of the power supply 102 if the wire feeder 104 is in communication with the power supply 102.

In examples, the power supply 102 delivers a power output directly to torch 106 without employing any contactor. In such an example, power regulation is governed by the control circuitry 112 and/or the power conversion circuitry 110. In some examples, a contactor 135 (e.g., high amperage relay) is employed and controlled by the wire feeder controller 134 and configured to enable or inhibit welding power to continue to flow to the weld cable 126 for the welding application. In some examples, the contactor 135 is an electromechanical device. However, the contactor 135 may be any other suitable device, such as a solid-state device. The wire feeder 104 includes a wire drive 136 that receives control signals from the wire feeder controller 134 to drive rollers 138 that rotate to pull wire off a spool 140 of wire. The wire is provided to the welding application through a torch cable 142. Likewise, the wire feeder 104 may provide the shielding gas from the cable 132 through the cable 142. The electrode wire, the shield gas, and the power from the weld cable 126 are bundled together in a single torch cable 144 and/or individually provided to the welding torch 106. In some examples, the contactor 135 is omitted and output or welding-type power is initiated and stopped by the power supply 102 without employing a contactor 135. In some examples, one or more sensors 127 are included with or connected to in the wire feeder 102 to monitor one or more welding parameters (e.g., power, voltage, current, wire feed speed, etc.) to inform the controller 134 during the welding process. In some examples, one or more sensors are included in the welding power supply 102.

The welding torch 106 delivers the wire, welding power, and/or shielding gas for a welding application. The welding torch 106 is used to establish a welding arc between the welding torch 106 and a workpiece 146. A work cable 148 couples the workpiece 146 to the power supply 102 (e.g., to the power conversion circuitry 110) to provide a return path for the weld current (e.g., as part of the weld circuit). The example work cable 148 is attachable and/or detachable from the power supply 102 for ease of replacement of the work cable 148. The work cable 148 may be terminated with a clamp 150 (or another power connecting device), which couples the power supply 102 to the workpiece 146. In some examples, one or more sensors 147 are included with or connected to the welding torch 106 to monitor one or more welding parameters (e.g., power, voltage, current, wire feed speed, etc.) to inform the controller 134 and/or 112 during the welding process. Although illustrated with the torch 106 (e.g., a welding tool, as described herein) connecting through wire feeder 104, in some examples the welding tool can connect directly to the welding power supply 102. For instance, a gouging and/or cutting tool may connect directly to studs or another power outlet of the welding power supply 102. In some examples, a wire feeder is integrated with the power supply, and studs or other power outlets are provided on the housing of such an integrated enclosure.

Figure 1B:
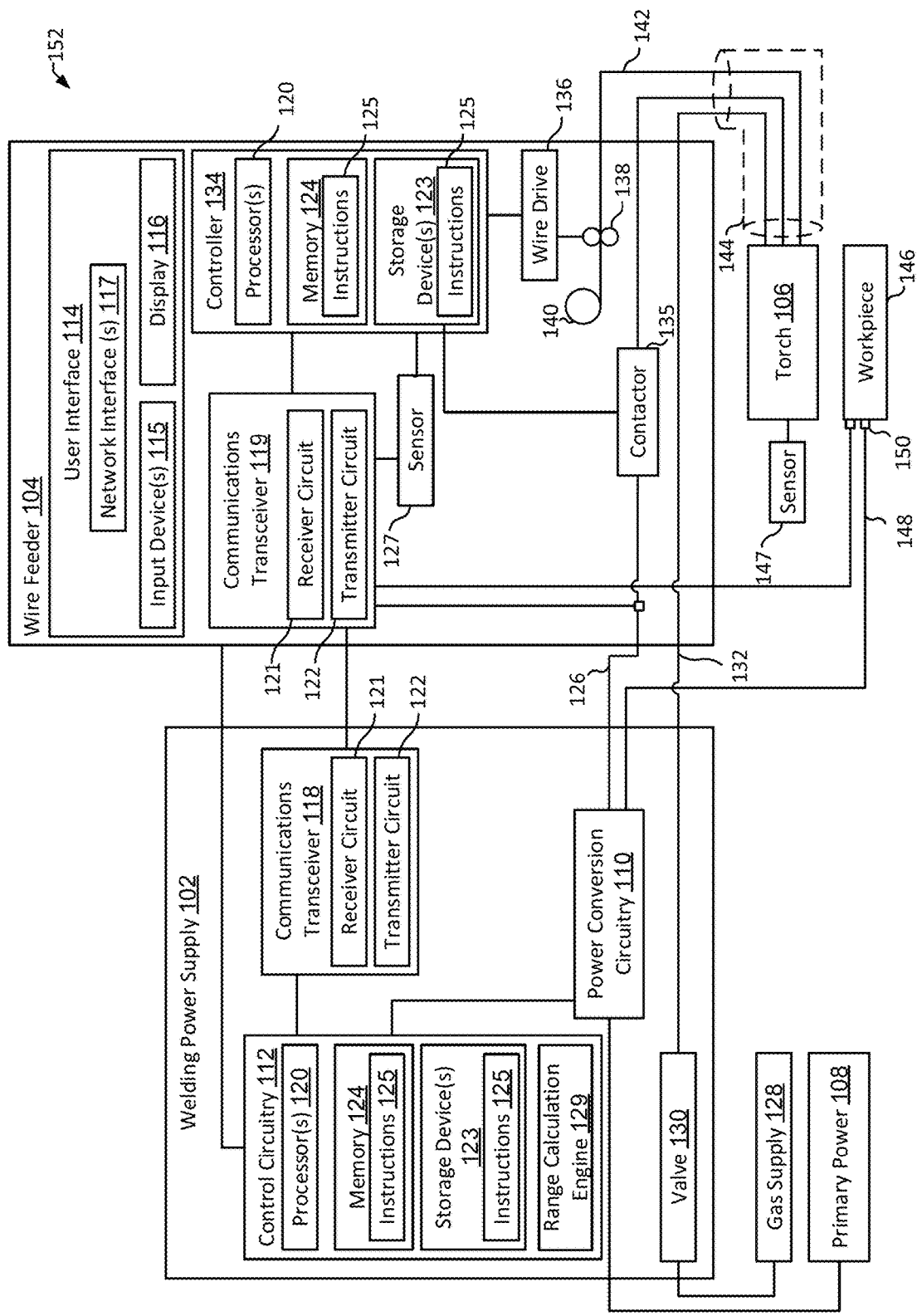
FIG. 1B is a schematic diagram of another example welding system including a wire feeder having a user interface to implement automatic control of welding parameter output ranges, in accordance with aspects of this disclosure.

FIG. 1B is a schematic diagram of another example welding system 152 in which the wire feeder 104 includes the user interface 114 in addition or as an alternative to the user interface on the welding power supply 102. In the example of FIG. 1B, the control circuitry 134 of the wire feeder 104 implements the determinations of the welding program and welding parameters which are described with reference to the control circuitry 112 of FIG. 1A.

Figure 1C:
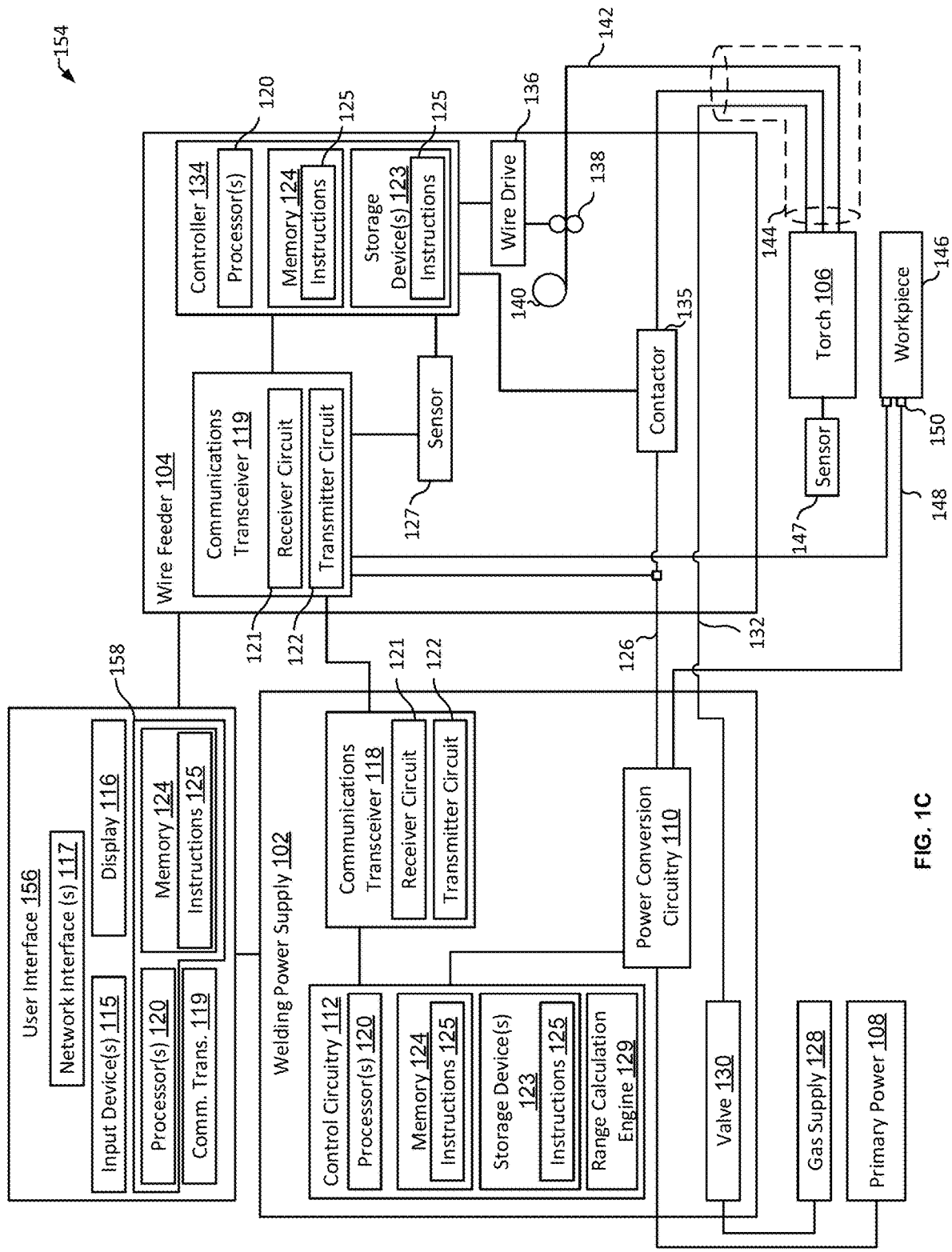
FIG. 1C is a schematic diagram of another example welding system including a user interface connected to a welding power supply and/or a wire feeder to implement automatic control of welding parameter output ranges, in accordance with aspects of this disclosure.

FIG. 1C is a schematic diagram of another example welding system 154 including a separate user interface 156. The user interface 156 is a separate device, and may be connected to the welding power supply 102 and/or to the wire feeder 104 to provide commands and/or control information. The example user interface 156 includes the input devices 115 and the display 116, and includes control circuitry 158. The example control circuitry 158 includes the processor(s) 120 and the memory 124 storing the instructions 125. The example user interface 156 further includes a communications transceiver 119 to enable communications between the user interface 156 and the welding power supply 102 and/or the wire feeder.

Although FIGS. 1A-1C are illustrated as having a user interface (114, 156) incorporated with a particular system, the illustration is exemplary such that one or more of the interfaces disclosed herein as well as additional user interfaces may be incorporated in one or more of the example welding systems disclosed herein. Furthermore, although power supply 102 and wire feeder 104 are illustrated as independent units, in some examples, the power supply and wire feeder can be housed in a single enclosure or otherwise integrated. Additionally or alternatively, a single controller, control circuitry, and/or interface can control operation of both the power supply and wire feeder, in some examples.

Figure 2A:
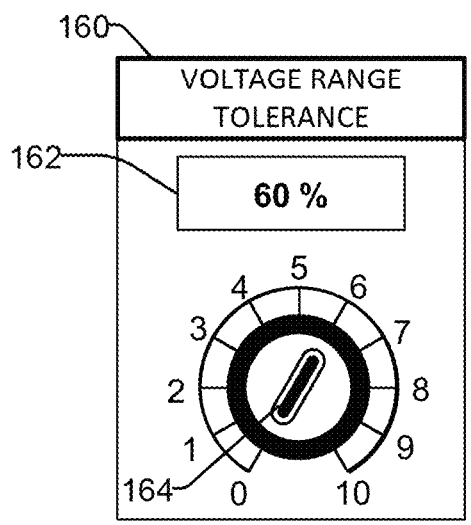
FIGS. 2A-2C illustrate example selection tools for range tolerance selection for welding parameters of a welding process, in accordance with aspects of this disclosure.
Figure 2B:
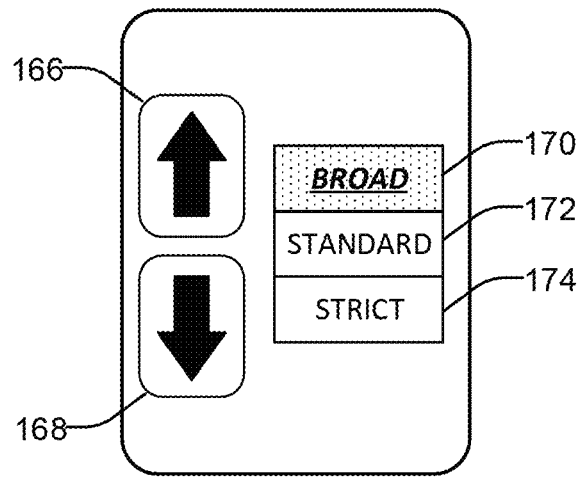
Figure 2C:
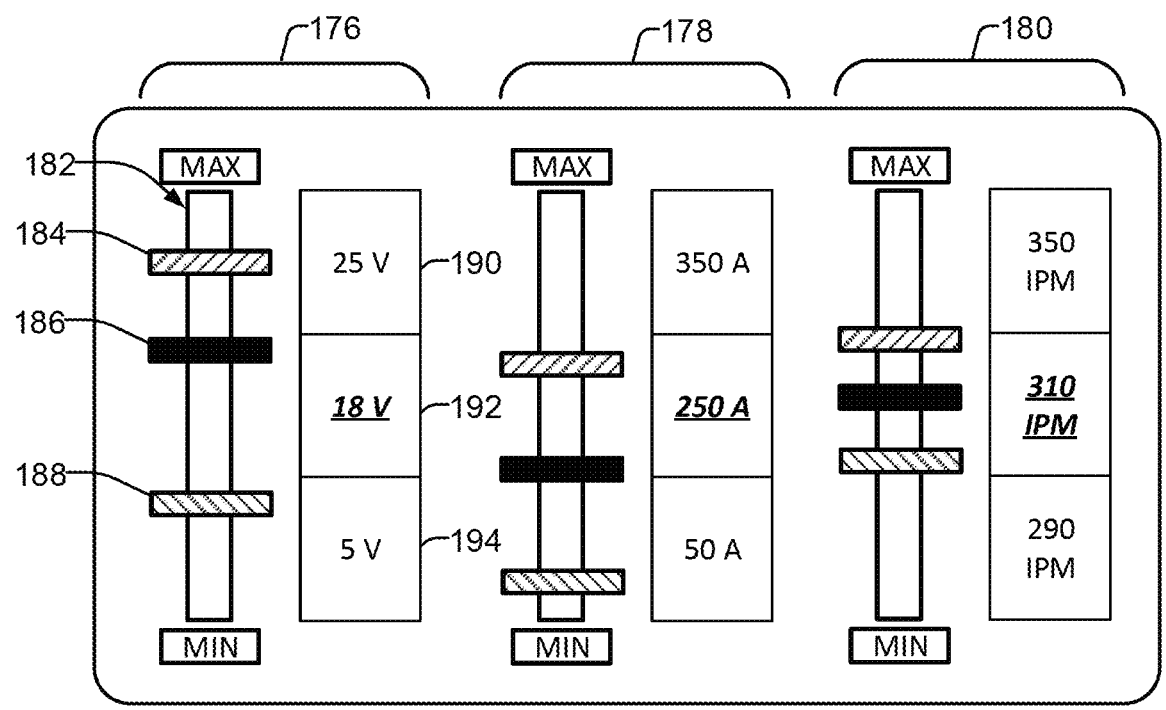

FIGS. 2A-2C illustrate example user interface elements (e.g., selection tools that can be provided via user interface 114) to implement the adjustable range tolerance settings disclosed herein. For instance, a separate command can be provided to activate a range adjustment protocol, such as a switch, button, instruction, etc. (e.g., an "easy limits" button). Once activated, as shown in the example of FIG. 2A, a knob or dial 164 can be turned around a numerical indicator associated with a range of tolerances, from a strict tolerance (e.g., at the lower end of the range) to a broad tolerance (e.g., at the higher end of the range). The selected range tolerance can be displayed in an information screen 162. Although shown with a single value (e.g., a 60% range tolerance of the maximum allowable variation for a voltage output), the range tolerance selection may toggle through various weld parameters or weld programs, such that different range tolerances may be designated for different weld parameters.

FIG. 2B illustrates an example selection tool having a first button 166 to scroll upward and/or increment a numerical value, and a second button 168 to scroll downward and/or decrement a numerical value. As shown, three range tolerances are provided for selection, such that the highlighted "broad" range tolerance 170 is selected, and the standard 172 and strict 174 tolerances are deselected. Similarly, the range tolerance selection may toggle through various weld parameters or weld programs, such that different range tolerances may be designated for different weld parameters by employing the selection tool of FIG. 2B or other related input device.

FIG. 2C illustrates an example selection tool displaying multiple sliding bars 182 with three graphical selectors: a welding parameter value selector 186; an upper limit selector 184; and a lower limit selector 188. Displayed adjacent each sliding bar 182 are numerical values corresponding to each selector 184, 186, 188. For example, display 190 shows the upper limit for the welding parameter is set to 25 volts, the desired welding parameter value is set to 18 volts, and the lower limit is set to 5 volts. Three welding parameter selection tools are provided in the example interface of FIG. 2C, such that voltage 176, current 178, and wire feed speed 180 can be adjusted and/or viewed simultaneously. In some examples, more or fewer applicable welding parameters are provided, and/or selectable from a list of welding parameters.

In some examples, the selection tool may be displayed as graphical input devices on the color display screen 116. For example, the color display screen 116 may be a touch screen configured to receive inputs from a user via such graphical input devices that are displayed on the color display screen 116. For instance, instead of (or in addition to) actual physical input devices disposed on the user interface 114, in certain examples, other types of user input elements, such as graphical buttons, sliders, knobs, and so forth, displayed via the color display screen 116 may be used to receive inputs from a user. In some examples, the selection tool of FIG. 2C can serve as a display associated with a separate input (e.g., a remoter and/or physical selector) to provide a visual indicator of the selected welding parameters and associated limits.

In some examples, the welding system(s) 100, 152, 154 may implement a synergic mode (once a default or customized setting has been established), in which the control circuitry 112, controller 134, and/or controller 158, receives a selection for a first welding parameter value (e.g., via an interface and/or from a programmed weld sequence), and calculates a second welding parameter value based on a predetermined relationship between the first welding parameter and the second welding parameter. In some examples, the predetermined relationship corresponds to the selected weld sequence program or a user identified relationship. The control circuitry/controller may enable or disable the synergic mode based on the selected weld sequence program (e.g., based on a selection of synergic weld process or a non-synergic weld process).

When the control circuitry/controller implements the synergic mode, the control circuitry/controller may determine ranges and/or range tolerances recommended for one or more applicable and/or selected welding parameters and/or weld program. For example, a range tolerance and/or a range of values may be stored as a list of values associated with one or more welding parameters (e.g., voltage, current, workpiece properties, etc.) in the storage device(s) 123 and/or the memory 124 as suitable for a particular weld program and wire feed speed.

In some examples employing the synergic mode, each of the one or more welding parameters is subject to a single range tolerance selection. In some examples, one or more of the one or more welding parameters may be deselected, however, and a different range tolerance can be assigned to the welding parameter. For example, if a customized weld program is to be employed, but the operator would like a different range tolerance for a particular welding parameter, the operator may toggle through the applicable welding parameters, deselect the particular welding parameter, and employ the one or more selection tools to adjust the value and/or range tolerance associated with the particular welding parameter.

In some examples, an automatic range setting program can be enabled or activated, such that the power supply 102 may automatically set welding voltage, welding amperage, and wire feed speed for a plurality of welding processes, electrode material types, and shielding gas types. Thus, upper and lower limits for each welding parameter are calculated or determined in accordance with the welding program or process, and/or an associated range tolerance. When automatic range setting is disabled, the power supply 102 may determine acceptable ranges of values (e.g., a standard or default range of values and/or calculated or determined from a default range tolerance) for the welding voltage, welding amperage, and wire feed speed, for instance, thus allowing an operator to manually adjust the parameters within the acceptable ranges of values.

Figure 3:
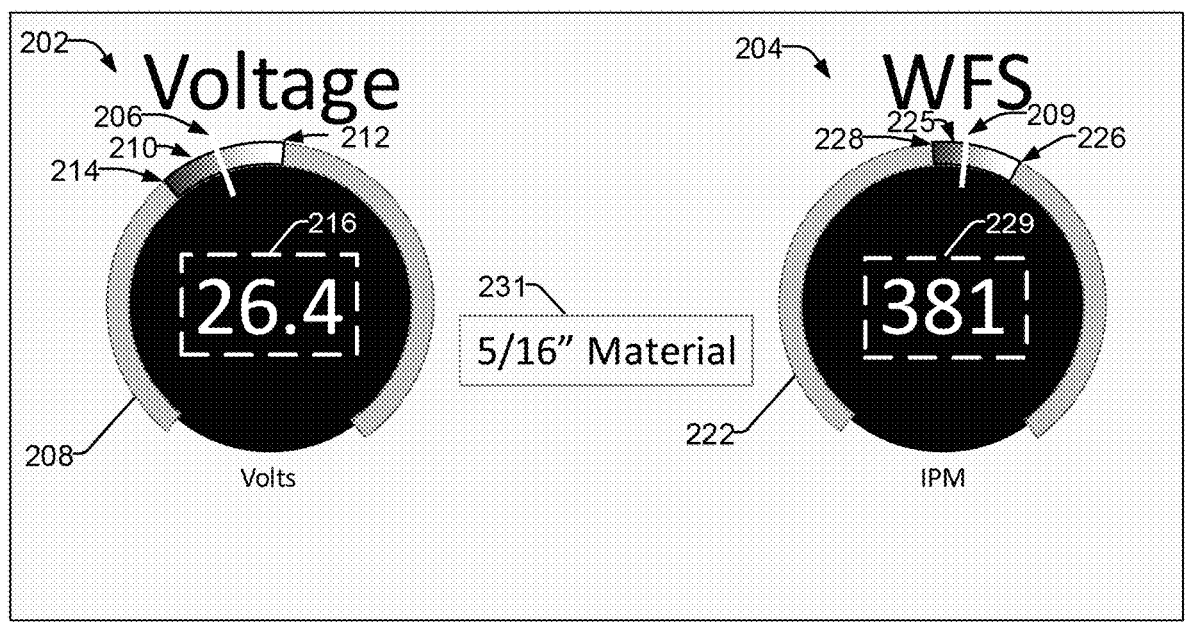
FIG. 3 provides an example graphical user interface displaying welding parameter output ranges, in accordance with aspects of this disclosure.

FIG. 3 illustrates an example graphical user interface 200 that may be used to implement the graphical user interface(s) 114, 156 and/or displays 116 of FIGS. 1A-1C. The graphical user interface 200 of FIG. 2 includes one or more graphical interfaces 202 and 204, one or more welding property displays 230. The graphical user interface 200 may include more or fewer of the example graphical interfaces 202, 204 illustrated in FIG. 2.

In addition to setting the voltage, the example control circuity/controller may recommended a material thickness corresponding to the selected welding parameters, and display the material thickness on the display 231. As illustrated in FIG. 2, a wire feed speed of 381 IPM results in a voltage value of 26.4 volts and a material thickness of 5/16". In some examples, the display 231 may provide additional or alternative information regarding one or more welding process parameters.

The graphical user interface 200 includes a first graphical interface 202 representing a first welding parameter, such as voltage. A second graphical interface 204 represents a second welding parameter, such as wire feed speed. Each graphical interface 202 and 204 may be controlled by a controller, such as control circuitry 112, controller 134, and/or controller 158, responsive to selectors 232 and 234, for example.

Each graphical interface 202 and 204 includes a marker 206, 209 representing the output value associated with the respective welding parameter (e.g., voltage or wire feed speed). During a welding process, each graphical interface 202 and 204 may display a numerical value 216, 229 corresponding to the welding system output of the particular welding parameter, such as measured from one or more sensors. In some examples, the numerical values 216, 229 represent an estimated, determined, or calculated value.

Each graphical interface 202 and 204 includes a graphical operating range 208, 222 representing the full operating range of output values for the particular welding parameter (e.g., based on the particular welding power source). Within each operating range is a graphical band 210, 225 providing a visual representation of the operating range bounded by the calculated or determined upper 212, 226 and lower 214, 228 limits calculated for the particular welding parameter (e.g., based on the selected range tolerance).

Figure 4:
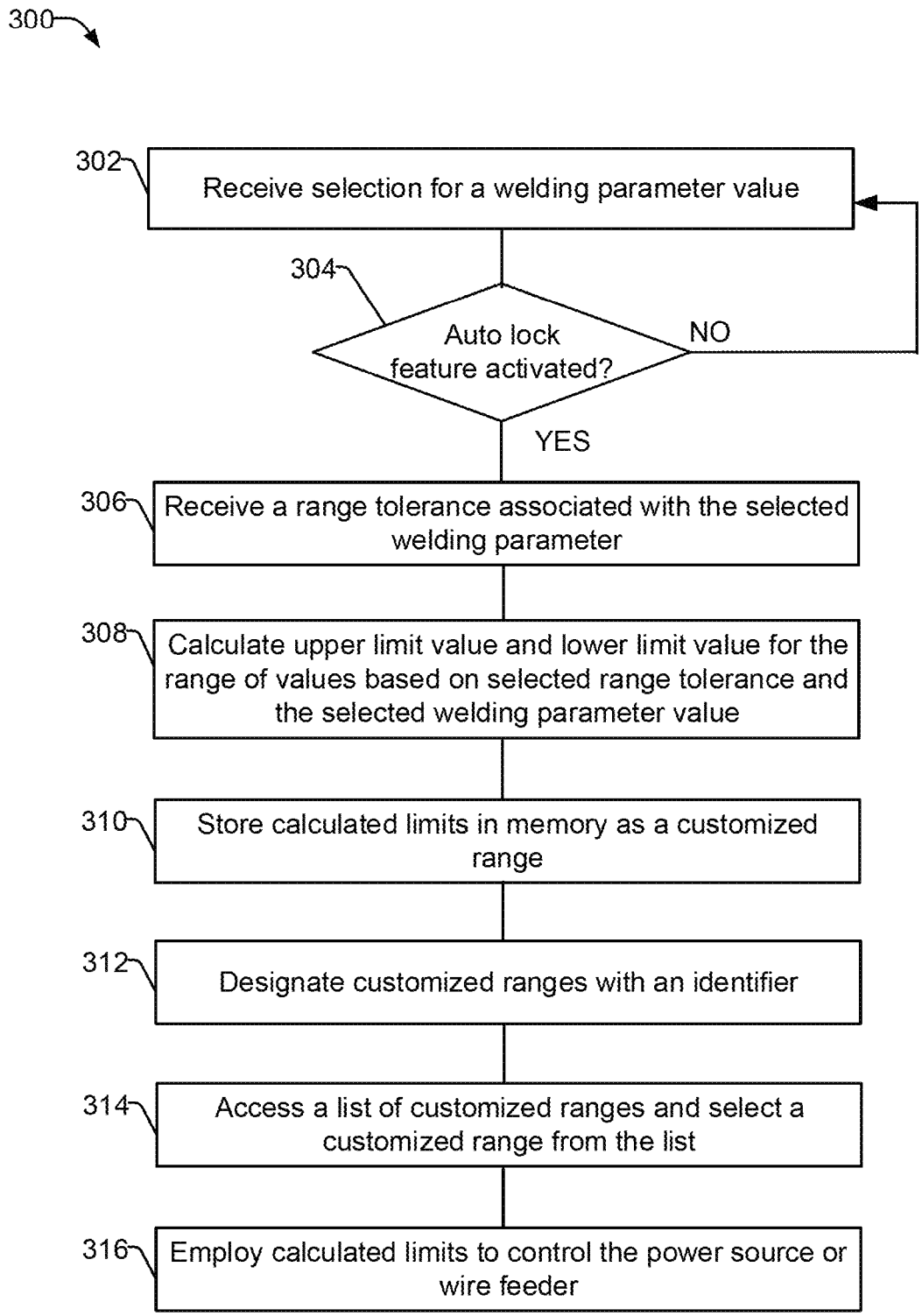
FIG. 4 provides a flowchart representative of example machine-readable instructions that may be executed by the example system of FIGS. 1A-1C to implement range tolerance selection for welding parameters of a welding process, in accordance with aspects of this disclosure.

FIG. 4 provides a flowchart representative of example machine readable instructions 300 which may be executed by the example welding system 100 of FIG. 1A, the example welding system 152 of FIG. 1B, and/or the example welding system 154 of FIG. 1C, to implement one or more ranges during a welding process. The example instructions 300 may be stored in the storage device(s) 123 and/or the memory 124 and executed by the processor(s) 120 of the control circuitry 112. The example instructions 300 are described below with reference to the systems of FIGS. 1A through 3.

In block 302, a control circuitry (e.g., control circuitry 112, 152, 154), receives a selection for a welding parameter value associated with a first welding parameter of the one or more welding parameters (e.g., voltage, current, power, wire feed speed, gas flow rate, pulse rate, workpiece thickness, workpiece material type, electrode type, welding process, travel speed, arc length, or joint type).

In block 304, the control circuitry determines whether a range auto-lock feature has been activated. If no, the process returns to block 302 to receive welding parameter values. If yes, the process advances to block 306, where the control circuitry receives a selected range tolerance from one or more range tolerances associated with the first welding parameter. For example, the range tolerance can be received from a user input and/or a welding program (e.g., via one or more selection tools, such as a user interface 114, memory 124, a remote computer via network interface 117, and/or the range tolerance selection tools of FIGS. 2A-2C). In some examples, a single range tolerance is available for each applicable welding parameter, such that calculating the limits for each welding parameter employs the same calculation (e.g., percentage value above and below a selected welding parameter).

In block 308, the control circuitry (e.g., via the range tolerance engine 129) calculates or determines an upper limit value and a lower limit value for the range of values based on the selected range tolerance and the selected welding parameter value In block 310, the control circuitry can optionally store the calculated or determined limits in memory as a customized range. In some examples, the customized limits are designated with an identifier in block 312. In block 314, a list of customized ranges can be accessed, scrolled through, and selected according to their identifier, allowing for easy recall and employment of stored customized ranges (e.g., via an interface and/or selection tool).

In block 316, the calculated or determined limits are then employed by the control circuitry to control the power source to deliver power and/or the wire feeder to advance the electrode wire based on the calculated or determined limits and the selected welding parameter value.

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be a processing system integrated into a welding power supply with a program or other code that, when being loaded and executed, controls the welding power supply such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine-readable storage media and to exclude propagating signals.

The control circuitry may identify welding conditions of a given weld and automatically find the optimum value of one or more welding parameters for the welding conditions. An example control circuit implementation may be an Atmel Mega16 microcontroller, a STM32F407 microcontroller, a field programmable logic circuit and/or any other control or logic circuit capable of executing instructions that executes weld control software. The control circuit could also be implemented in analog circuits and/or a combination of digital and analog circuitry. Examples are described herein with reference to various types of welders, but may be used or modified for use in any type of high frequency switching power source.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A welding system, comprising:
   a control circuitry to control a power source based on a range of values associated with one or more welding parameters, the control circuitry configured to:
   receive a selected range tolerance from one or more range tolerances associated with a selected welding parameter value of the one or more welding parameters;
   calculate an upper limit value and a lower limit value for the range of values based on the selected range tolerance, the selected welding parameter value, and a welding parameter type of the one or more welding parameters associated with the range of values, the calculating comprising:
   receiving a selected range value associated with the selected range tolerance;
   receiving a welding parameter modification value associated with the welding parameter type;
   calculating a first predetermined value and a second predetermined value by modifying the selected range value using the welding parameter modification value;
   adding the first predetermined value to the selected welding parameter value to calculate the upper limit value for the range of values; and
   subtracting the second predetermined value from the selected welding parameter value to calculate the lower limit value for the range of values; and
   control the power source to deliver power based on the range of values and the selected welding parameter value.

2. The welding system of claim 1, wherein the one or more range tolerances comprises a strict range tolerance, a standard range tolerance, or a broad range tolerance.

3. The welding system of claim 2, wherein the controller is further configured to adjust the range tolerance between a low limit of the strict range tolerance and a high limit of the broad range tolerance in response to an input.

4. The welding system of claim 3, wherein the input is a change in a welding parameter of the one or more welding parameters.

5. The welding system of claim 3, wherein the input is an operator input from a user interface, the user interface comprising one or more of a knob, a touchscreen panel, or a dial.

6. The welding system of claim 2, wherein the strict range tolerance is more narrow than the standard range tolerance, and the standard range tolerance is more narrow than the broad range tolerance.

7. The welding system of claim 1, wherein:
   the control circuitry is further configured to calculate the upper limit value by adding a first predetermined value to the selected welding parameter value;
   the control circuitry is further configured to calculate the lower limit value by subtracting a second predetermined value from the selected welding parameter value; and
   the first predetermined value and the second predetermined value are different.

8. The welding system of claim 1, wherein the control circuitry is further configured to calculate the upper limit value and the lower limit value by:
   adding a first percentage of an absolute value of the selected welding parameter value to the selected welding parameter value; or
   subtracting a second percentage of the absolute value of the selected welding parameter value from the selected welding parameter value.

9. The welding system of claim 1, wherein the one or more welding parameters further comprises a second welding parameter, the welding parameter selects the range tolerance from a first plurality of range tolerances of the one or more range tolerances and the second welding parameter selects a second range tolerance from a second plurality of range tolerances of the one or more range tolerances, the second plurality of range tolerances being different from the first plurality of range tolerances.

10. The welding system of claim 1, wherein the one or more welding parameters includes one or more of voltage, current, power, wire feed speed, gas flow rate, pulse rate, workpiece thickness, workpiece material type, electrode type, welding process, travel speed, arc length, or joint type.

11. The welding system of claim 1, wherein the control circuitry calculates the upper limit value and the lower limit value by:
   accessing a list of welding parameter values associated with the welding parameter type, the list of welding parameter values comprising listed upper limit values or listed lower limit values associated with respective welding parameter values;
   comparing the selected welding parameter value to the listing of welding parameter values; and
   determining at least one of the upper limit value or the lower limit value based on the welding parameter values and the listed upper limit values or the listed lower limit values.

12. A welding system, comprising:
   a power source configured to deliver power to a welding tool based on one or more welding parameters;
   a welding wire feeder configured to advance a wire electrode to the welding torch based on the one or more welding parameters; and
   a control circuitry to control the power source or the wire feeder based on one or more ranges of values associated with the one or more welding parameters, the control circuitry configured to:
   receive a first selection for a first selected welding parameter value associated with a first selected welding parameter of the one or more welding parameters;
   receive a second selection for a second selected welding parameter value associated with a second selected welding parameter of the one or more welding parameters;
   receive a selected range tolerance from one or more range tolerances associated with the first selected welding parameter and the second selected welding parameter;
   receive a selected welding process type from one or more welding process types;

calculate a first upper limit value and a first lower limit value for a first range of values based on the selected welding process type, the selected range tolerance, a first welding parameter type of the first selected welding parameter, and the first selected welding parameter value, the first range of values corresponding to the first selected welding parameter value;

calculate a second upper limit value and a second lower limit value for the second range of values based on the selected welding process type, the selected range tolerance, a second welding parameter type of the second selected welding parameter, and the second selected welding parameter, the second range of values corresponding to the second selected welding parameter value, wherein:
- a first ratio of the first upper limit value to the first selected welding parameter value differs from a second ratio of the second upper limit value to the second selected welding parameter value;
- a third ratio of the first lower limit value to the first selected welding parameter value differs from a fourth ratio of the second lower limit value to the second selected welding parameter value; or
- the first ratio differs from the second ratio and the third ratio differs from the fourth ratio; and control the power source to deliver power or the welding wire feeder to advance the electrode wire based on the first range of values, the first selected welding parameter value, the second range of values, and the second selected welding parameter value.

13. The welding system of claim 12, wherein the control circuitry is further configured to:
designate the first selected welding parameter value and the first range of values as a customized welding parameter setting; and
store the first selected welding parameter value and the first range of values in a list of values associated with one or more customized welding parameters.

14. The welding system of claim 13, wherein the control circuitry is further configured to:
receive an input corresponding to a customized welding parameter setting; and
control the power source to deliver power or the welding wire feeder to advance the electrode wire based on the customized welding parameter setting.

15. The welding system of claim 12, wherein the control circuitry is further configured to:
receive an input relating to the selected welding process type via a welding process type input device; and
calculate the first range of values for the first selected welding parameter value based at least in part on a range tolerance associated with one or more welding parameters of the welding process type.

16. The welding system of claim 15, wherein the welding process type input device comprises a selectable option of one or more of a gas metal gas arc welding (GMAW), a gas tungsten arc welding (GTAW), plasma cutting, Carbon Arc Cutting-Air (CAC-A), or a stick welding process as the welding process type.

17. The welding system of claim 12, wherein the control circuitry is further configured to:
receive an input corresponding to one or more default settings for the one or more welding parameters;
access the default settings from a list of values associated with the one or more welding parameters; and
control the power source to deliver power or the welding wire feeder to advance the electrode wire based on the one or more default settings.

18. The welding system of claim 12, wherein the first welding parameter type comprises at least one of voltage, current, power, wire feed speed, gas flow rate, pulse rate, workpiece thickness, workpiece material type, electrode type, welding process, travel speed, arc length, or joint type.

19. The welding system of claim 12, wherein the second welding parameter type comprises at least one of voltage, current, power, wire feed speed, gas flow rate, pulse rate, workpiece thickness, workpiece material type, electrode type, welding process, travel speed, arc length, or joint type.

20. The welding system of claim 12, wherein the selected range tolerance comprises a first selected range tolerance associated with the first welding parameter and a second selected range tolerance associated with the second welding parameter.

* * * * *